May 12, 1925.
G. W. CUMMINGS ET AL
1,537,159
LUBRICATING ATTACHMENT FOR TRANSMISSION CASES
Filed Oct. 29, 1924
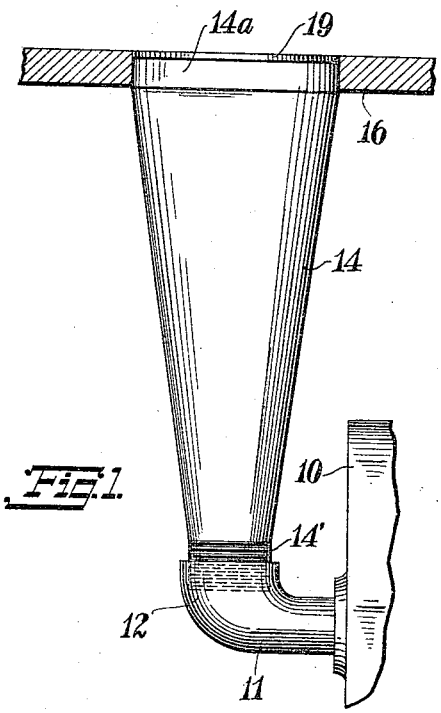
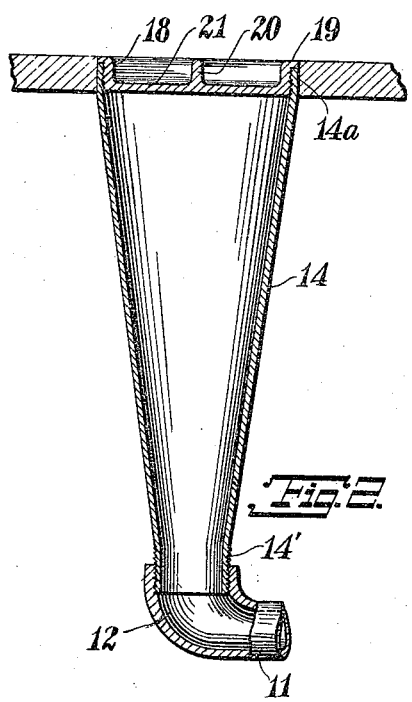
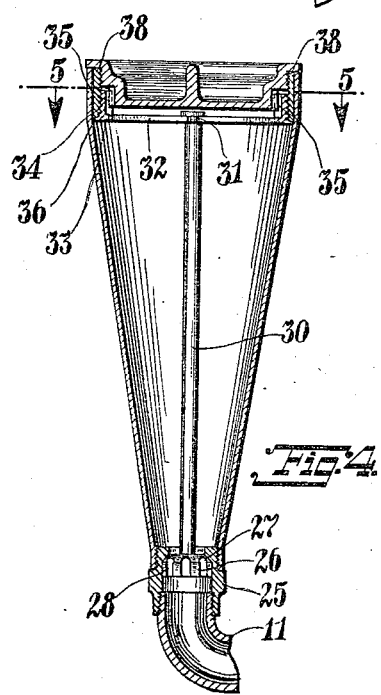
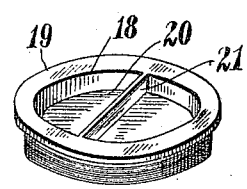
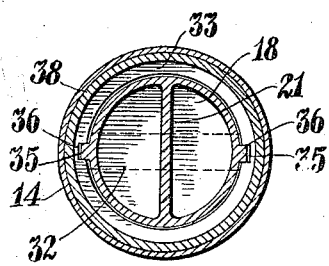
INVENTORS
George W. Cummings
George P. Cummings
BY
ATTORNEY Patented May 12, 1925.

1,537,159

UNITED STATES PATENT OFFICE.

GEORGE W. CUMMINGS AND GEORGE P. CUMMINGS, OF ELMHURST, NEW YORK.

LUBRICATING ATTACHMENT FOR TRANSMISSION CASES.

Application filed October 29, 1924. Serial No. 746,507.

*To all whom it may concern:*

Be it known that we, GEORGE W. CUMMINGS and GEORGE P. CUMMINGS, citizens of the United States, residing at Elmhurst, in the county of Queens and State of New York, have invented certain new and useful Improvements in Lubricating Attachments for Transmission Cases, of which the following is a specification.

This invention relates to a lubrication attachment for transmission cases, the invention having more particular reference to a device for facilitating the filling of the transmission case of an automobile with a lubricating oil, thereby lubricating both the transmission and its appendages, such as clutch shafts and universal joint, and the like.

The invention has for an object the provision, on the transmission case of an automobile of a simple and inexpensive device which permits of the said case being filled with the lubricating oil without the need of removing floorboards or such parts, and without the need of reaching parts that are remote or difficult of access.

For further comprehension of the invention, and of the objects and advantages thereof, reference will be had to the following description and accompanying drawing, and to the appended claims in which the various novel features of the invention are more particularly set forth.

Fig. 1 of the drawing is a vertical elevational view, with parts in section showing our improved filler device.

Fig. 2 is a central vertical sectional view thereof.

Fig. 3 is a detail perspective view of the filler cap.

Fig. 4 is a central vertical sectional view showing a modification.

Fig. 5 is a horizontal sectional view taken on the line 5—5 of Fig. 4.

In the drawing the side of the transmission case of an automobile is shown at 10, and has attached thereto a filler tube 11 through which the lubricating oil is fed into the said case, this tube being upturned at its end as at 12 this upturned end being exteriorly screwthreaded. These parts as thus described are all of usual construction. In carrying out our invention we mount on the upturned end of the tube 11 a funnel 14 which has its lower end suitably formed to connect to said tube, being here shown as provided with a screwthreaded neck 14' at its lower end. The upper end of this funnel is fitted snugly in an aperture in the floorboard of the automobile, a portion of the said floorboard being shown at 16, the upper end of the funnel being substantially flush with the top face of said board. This upper end of the funnel is in the form of a short cylindrical extension 14ª that is interiorly screwthreaded to receive a closing cap. This cap is shown generally at 18 and fits into the said extension 14ª, having a radial flange 19 at its upper edge that engages over the top edge of the funnel. The cap is hollowed out or recessed on its upper side as at 20 and a rib 21 extends across said recess, this rib being provided to facilitate gripping the cap, with the hand or with a wrench, to rotate the same. Normally this cap is covered by the usual rubber mat on the floor 16, and when lubricating oil is to be placed in the transmission case the mat is removed, the cap unscrewed and the oil poured into the funnel. As will be apparent access to this funnel is more readily had than can be had to the tube 11.

As shown in Fig. 4 we may provide a valve on the upper end of the tube 11. As here shown a nipple 25 is fitted on top of this tube and has slidable therein a valve 26 that seats upward on a seat 27 in the upper end of the nipple. The valve is provided with a number of grooves or flutes 28 along the side to permit of flow of the liquid past the same when the valve is opened. Fixed to this valve is an upwardly projecting stem 30 that has a swivel connection as at 31 with a crossbar 32 fixed at its ends to a ring 33. This ring engages left hand screwthreads 34 in the top of the funnel 14 located below the right hand screwthreads that the cap 18 engages, while the latter is formed on its sides with projecting ribs or tongues 35 that engage in vertical grooves 36 in the inner face of the ring. As will be apparent, when the cap is unscrewed, the ring 33 will be caused to rotate with the cap end, by reason of its left hand thread connection with the funnel, move downward to open the valve. When the cap is again applied its tongues 35 are first engaged with the grooves 36 and the rotation of the cap then raises the ring and moves the valve 26 to closed position. For convenience in construction we have shown the right and left hand screwthreads in the upper end of the funnel as formed on a bushing 38 fitted into said upper end.

Having thus described our invention, what we claim as new and desire to protect by Letters Patent of the United States is as follows:—

1. A filler device for the transmission case of an automobile comprising a funnel leading to said case and having its mouth located in the floorboard of the automobile.

2. A filler device for the transmission case of an automobile comprising a funnel leading to said case and having its mouth located in the floorboard of the automobile, and a cap screwed into the mouth of said funnel.

3. A filler device for the transmission case of an automobile comprising a funnel leading to said case and having its mouth located in the floorboard of the automobile, and a cap screwed into the mouth of said funnel, said cap having a rib formed thereon for rotation purposes.

4. In a device of the class described, a filler tube, a funnel seated on said tube, an upwardly seating valve closing the top of said tube, a stem on said valve extending upward through the funnel, a ring located in the upper end of the funnel and having a swivel engagement therewith, a crossbar extending across the said ring with which the upper end of said stem has a swivel engagement, a cap screwed into the upper end of said funnel, said cap and ring being formed respectively with opposite screwthreads, and connections between the cap and the ring whereby the latter is caused to be rotated in unison with the cap while permitting relative axial movement.

5. In a device of the class described, a filler tube, a funnel seated on said tube, an upwardly seating valve closing the top of said tube, a stem on said valve extending upward through the funnel, a ring located in the upper end of the funnel and having a swivel engagement therewith, a crossbar extending across the said ring with which the upper end of said stem has a swivel engagement, a cap screwed into the upper end of said funnel, said cap and ring being formed respectively with opposite screwthreads, and connections between the cap and the ring whereby the latter is caused to be rotated in unison with the cap while permitting relative axial movement, said connections comprising tongues on the cap engaging grooves in the ring.

In testimony whereof we have affixed our signatures.

GEORGE W. CUMMINGS.
GEORGE P. CUMMINGS.